US008751340B2

(12) United States Patent
Piedra et al.

(10) Patent No.: US 8,751,340 B2
(45) Date of Patent: Jun. 10, 2014

(54) CHECK DESTRUCTION TRACKING AND RECONSTRUCTION

(75) Inventors: Humberto Kenneth Piedra, Miami, FL (US); Hamilton Tarry Boyd, Atlanta, GA (US); Mark David Felse, Fort Mill, SC (US); Barry Thomas Vanlandingham, Richmond, VA (US)

(73) Assignee: Bank of America Corporation, Charlotte, NC (US)

( * ) Notice: Subject to any disclaimer, the term of this patent is extended or adjusted under 35 U.S.C. 154(b) by 683 days.

(21) Appl. No.: 12/350,669

(22) Filed: Jan. 8, 2009

(65) Prior Publication Data

US 2010/0174632 A1 Jul. 8, 2010

(51) Int. Cl.
*G06Q 40/00* (2012.01)

(52) U.S. Cl.
USPC ............................................................ 705/35

(58) Field of Classification Search
CPC .................................................... G06Q 40/00
USPC .......................................................... 705/35
See application file for complete search history.

(56) References Cited

U.S. PATENT DOCUMENTS

| 5,354,001 | A | 10/1994 | Hasegawa |
| 6,407,665 | B2 * | 6/2002 | Maloney ..................... 340/568.1 |
| 7,198,210 | B2 * | 4/2007 | Kusters ........................... 241/30 |
| 2005/0065987 | A1 | 3/2005 | Telkowski |
| 2005/0119786 | A1 | 6/2005 | Kadaba |
| 2006/0180686 | A1 * | 8/2006 | Podrovitz ................... 241/101.2 |
| 2007/0080249 | A1 * | 4/2007 | Hamasuna et al. ............. 241/36 |
| 2008/0021790 | A1 * | 1/2008 | Brown et al. .................... 705/24 |
| 2008/0083823 | A1 * | 4/2008 | Revankar et al. ............. 235/375 |
| 2008/0245791 | A1 * | 10/2008 | Atherton ....................... 220/200 |

FOREIGN PATENT DOCUMENTS

CN 101103382 1/2008

OTHER PUBLICATIONS

EP Examination Report dated Feb. 15, 2011 for European Application No. 10250015.4.
European Patent Office; Extended European Search Report; Jun. 4, 2010; issued in European Patent Application No. 10250015.4.
Mexican Office Action issued in MX Patent Application No. MX/a/2010/000210, dated Aug. 14, 2012.
Office Action issued in CN Application No. 201010125749.0 dated Sep. 3, 2013.

* cited by examiner

*Primary Examiner* — James A Vezeris
(74) *Attorney, Agent, or Firm* — Michael A. Springs; Moore & Van Allen, PLLC; Nicholas C. Russell

(57) ABSTRACT

A method for check destruction tracking and reconstruction relates to tracking the destruction of financial institution items, such as paper checks. The method includes transferring the financial institution items to a bin for transporting the items to be destroyed. The bin is associated with a bin identifier. The items which are in the bin are identified and the bin is transported for destruction. If the items are safely transported and safely destroyed, a notification of destruction of the items in the bin is sent. If the items are either not safely transported or not safely destroyed, a notification of an incident is sent. Appropriate action may be taken in response to receiving such notification.

16 Claims, 2 Drawing Sheets

CHECK DESTRUCTION TRACKING AND RECONSTRUCTION

BACKGROUND

Today, after banks process paper checks, the checks are sent to be destroyed to ensure the information on the checks remains private. However, prior to destruction, such private information on the checks may be compromised and misappropriated, by, for example, lost checks, misplaced checks or checks being stolen. There is no current process to ensure that the checks (or other items of a financial institution) are indeed destroyed without any private data from the checks being compromised prior to destruction.

SUMMARY

In accordance with an embodiment of the present invention, a method for check destruction tracking and reconstruction relates to tracking the destruction of financial institution items, such as paper checks. The method includes transferring the financial institution items to a bin for transporting the items to be destroyed. The bin is associated with a bin identifier. The items which are in the bin are identified and the bin is transported for destruction. If the items are safely transported and safely destroyed, a notification of destruction of the items in the bin is sent. If the items are either not safely transported or not safely destroyed, a notification of an incident is sent.

In accordance with another embodiment of the present invention, a method for check destruction tracking and reconstruction includes providing one or more groupings of the one or more financial institution items and transferring the groupings to a plurality of bins which are each used to transport one or more groupings of items to a site where the items will be destructed. A label is created for each of the groupings and each label is associated with the bin that contains the groupings of items corresponding to the label. The bins are then transported for destruction. After destruction, if the items are safely transported and safely destroyed, a notification of destruction of the items in the bin is sent. If the items are either not safely transported or not safely destroyed, a notification of an incident is sent.

In accordance with yet another embodiment of the present invention, a method for check destruction tracking and reconstruction includes transferring one or more financial institution items to an entity so that the entity transports the items to be destroyed via a holding container. After destruction of the items, either a notification of safe destruction is received if the items are safely transported and safely destroyed or a notification of an incident is received if the items are not safely transported or not safely destroyed.

In accordance with another embodiment of the present invention, an apparatus for check destruction tracking and reconstruction includes means for transporting financial institution items to be destroyed, the transporting means having an identifier and means for identifying which items are located in the transporting means. The apparatus also includes means for receiving notification of destruction of the items in response to safe transport and safe destruction of the items and means for receiving notification of an incident in response to the transporting means being compromised.

In accordance with another embodiment of the present invention, a system for check destruction tracking and reconstruction includes a bin and a processing unit. The bin receives one or more financial institution items to be destroyed, the bin having an identifier. The processing unit is configured to respond to computer instructions to receive notification of destruction of the items in the holding container in response to safe transport and safe destruction of the items in the bun and receive notification of an incident in response to the bin being compromised.

Other aspects and features of the present invention, as defined by the claims, will become apparent to those skilled in the art upon review of the following non-limited detailed description of the invention in conjunction with the accompanying figures.

DETAILED DESCRIPTION

Embodiments of the present invention are described below with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operation area steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

It should be understood that terms like "bank," "financial institution," and just "institution" are used herein in their broadest sense. Institutions, organizations, or even individuals, that process loans are widely varied in their organization and structure. Terms like bank and financial institution are intended to encompass all such possibilities, including but not limited to, finance companies, stock brokerages, credit unions, mortgage companies, manufacturers who grant loans to secure the purchase of goods, finance companies, computer companies, etc. Additionally, disclosed embodiments may suggest or illustrate the use of agencies or contractors external to the financial institution to perform some of the calculations and data repository services. These illustrations are examples only, and an institution or business can implement the entire invention on their own computer systems or even a single work station if appropriate databases are present and can be accessed.

Figure 1:
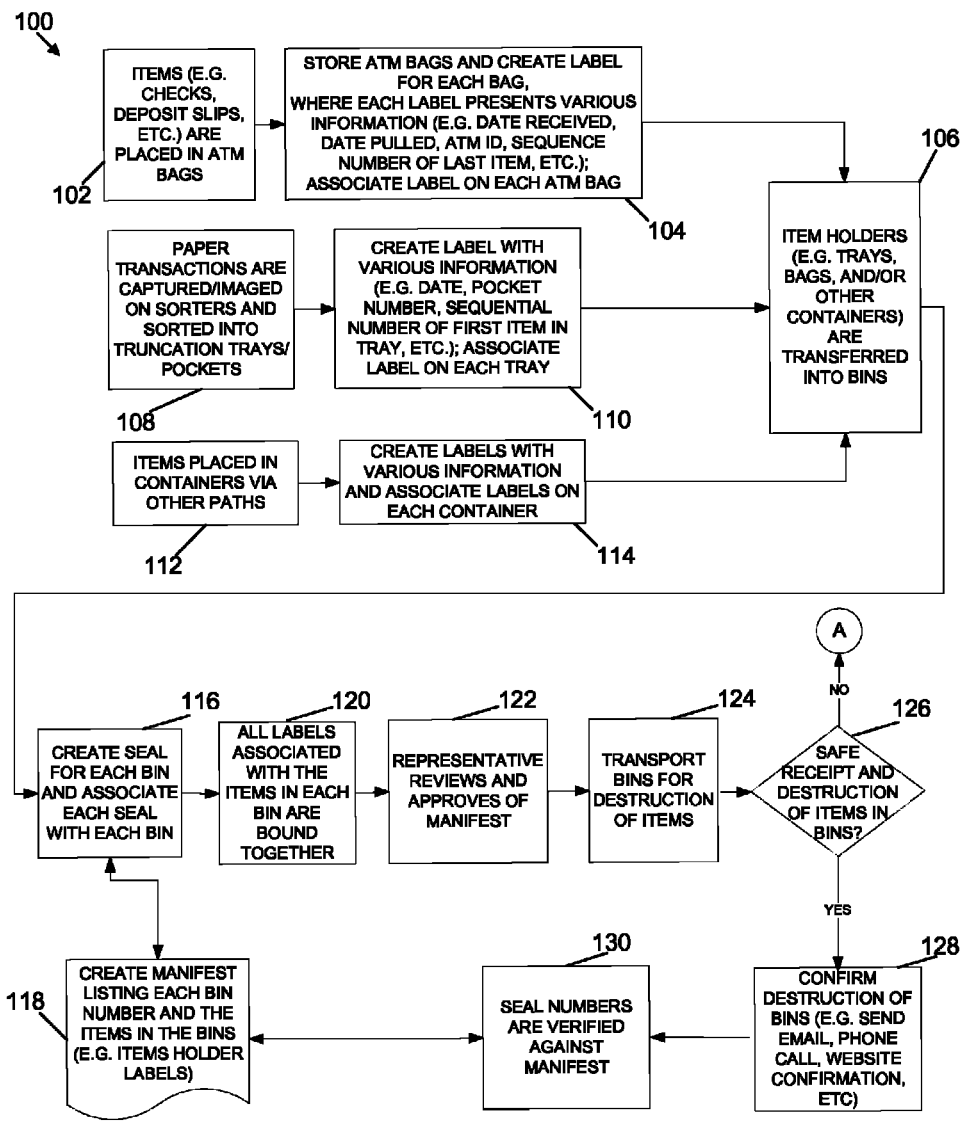
FIG. 1 is a flow chart of an exemplary system and process for check destruction tracking in accordance with an embodiment of the present invention.
Figure 2:
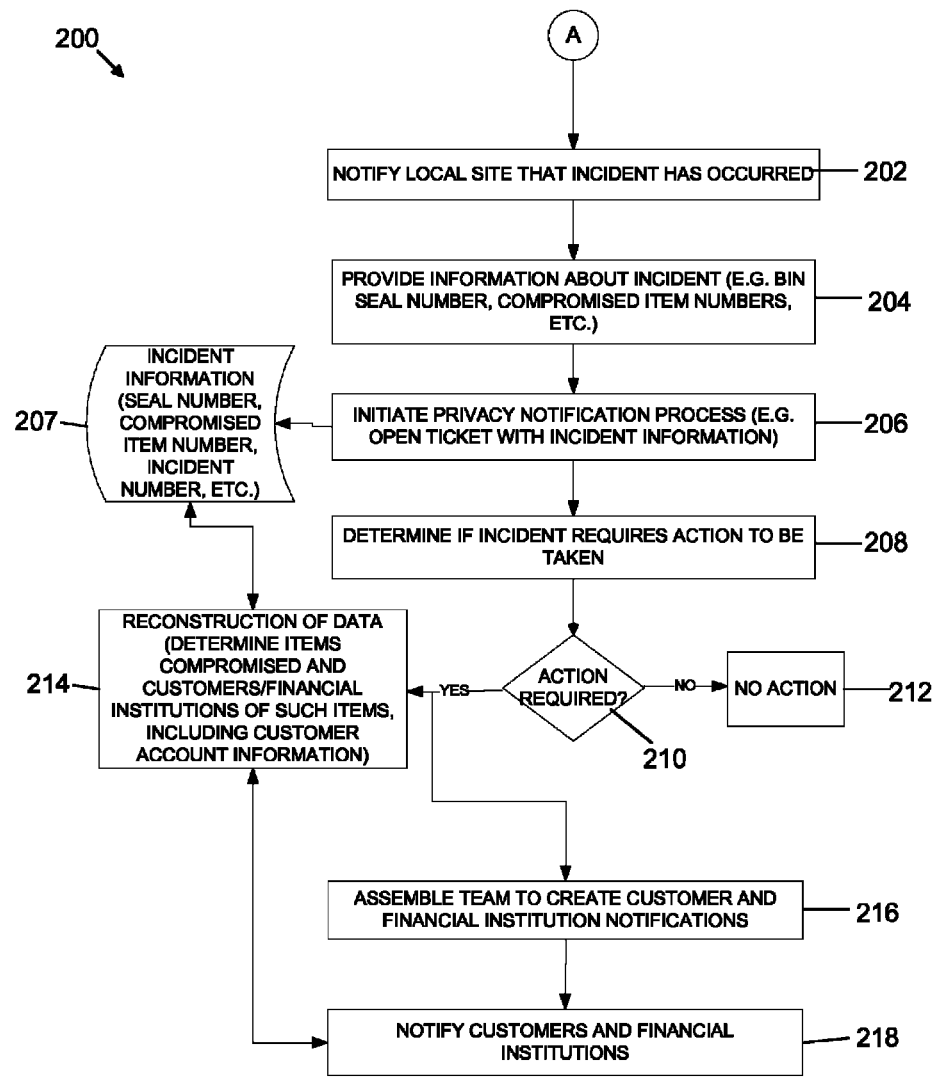
FIG. 2 is a flow chart of an exemplary process for check reconstruction in the event of an incident in accordance with an embodiment of the present invention.

As illustrated in FIGS. 1-2, embodiments of the present invention are generally directed to check destruction tracking and reconstruction. It should be understood that embodiments of the present invention may be directed to items other than checks, such as direct deposit slips and/or any other financial institution item. A check generally contains various information including, place of issue, check number, date of issue, payee, amount of currency, signature of the drawer, routing transit number (RT), account number, fractional routing number, etc. A sequence number is assigned to each check after each check is processed.

In processing a deposited paper check, the check may be converted into a check image or may remain a paper check and delivered to another location. If the check is imaged, the check becomes a digitized image of the original paper check, which may be electronically transmitted and processed. The imaged check includes front and back images of the original check, together with the check-writer's bank routing number, account number, and the dollar amount of the check in a magnetic ink character recognition (MICR) line along the bottom. After a check is imaged, the paper version of the check is retained for a retention period and thereafter, the paper check is no longer needed. After the paper check is no longer needed, the paper check is sent to be destroyed so that the private information contained by the check may not be obtained and/or misappropriated by anyone.

FIG. 1 illustrates an exemplary system and method 100 of check destruction tracking in accordance with one embodiment. After processing, paper checks are collected and placed into containers. Labels are then created for each check container and placed thereon.

For example, blocks 102 and 104 illustrate receiving checks via an ATM. First, the checks that are processed via an automated teller machine (ATM) are placed into ATM bags, as shown in block 102.

In block 104, the ATM bags are stored for an appropriate retention period to ensure that they will not be needed in the future. After determining the checks will not be needed, a label is created for each ATM bag. Each label presents various information about the check, the check transaction and/or the customer account, such as date received, date pulled, ATM identification, sequence number of the first and/or last item in the bag and the like. The labels are associated with each respective ATM bag to identify which checks (via sequence numbers or other identifiers) are in which bags.

In block 106, after associating the labels with the ATM bags, the checks are transferred into large holding bins. The holding bins are containers which hold and deliver the checks to the check destruction site.

Checks may also be transferred into the bins through other paths other than through ATMs. For example, in block 108, paper checks via transactions, such as at a bank, are captured and/or imaged on high speed sorters. After imaging, the paper checks are sorted and placed into truncation trays or pockets. In block 110, a label is created for each of the trays. Each label includes various information about the checks including check date, sequential number of first item in the tray, sequential number of last item in the tray, number of items in the trays, other check information, and the like. Each label is associated with each respective tray. After the checks in the trays are no longer needed, the trays are dumped in a specific bin, as shown in block 106.

In blocks 112 and 114, other methods of receiving paper checks and labelling these checks are possible. For example, checks that must be sent away from a bank for processing are placed in containers (block 112) and labels are created (block 114) with various information about the checks, including, for example, sequence numbers of the first and last items in the containers. Each label is associated with each container so that the items in the containers will be tracked. After an appropriate retention period, the items in the containers are transferred into the bins, as shown in block 106.

In block 116, a seal is created for each bin. After all of the items have been placed in the bins, each seal is placed on the bin to ensure that the bins are not opened and also to associate an identifier (e.g. a number, label, etc.) with each bin. In one embodiment, a bin identifier is used to identify which bin the items are placed in.

In block 118, a manifest is created listing each bin via the seal number, the items in the bins, and/or the labels of the item holders (e.g. trays, bags, containers, etc.). The manifest is a spreadsheet or a database which identifies which checks are associated with which bins.

In block 120, all of the labels of the trays, ATM bags, or other containers are associated with the items (e.g. checks) in each bin are bound together.

In block 122, a representative reviews and approves of the manifest. The representative may be a bank employee or a third party. The representative approves of the manifest in order to ensure accuracy of the bins and the seals and the labels to the bins.

In block 124, after the bins have been sealed and the manifest created, the bins are transported for destruction. In block 126, a determination is made as to whether the bins have been safely transported and safely destroyed. Safe transport includes transporting the bins without the bins being opened or accessed. If the seal of the bin has been broken or altered or the bin has been damaged or accessible in any way, transport of the bin is not considered safe and notification of the bank is required. Safe destruction includes successfully destroyed each and every item in the bin. Destruction of the items in the bins is meant to include any means of destroying the information on the checks so that no one else can access such information, such as shredding and/or burning the checks.

In block 128, if the bins are safely transported and safely destroyed, completion of the destruction of the bins is confirmed, such as by sending an email, updating a website, placing a phone call or any other manner to notify the bank. Information sent to the bank via such confirmation process includes the bins seal numbers, any information located on the seals and/or bins, date of destruction, place of destruction, and any other information associated the bins and/or items in the bins.

After the bank has been notified of safe transport and destruction of the bins, a bank representative verifies each seal number provided to the manifest, as shown in block 130. The manifest is updated to indicate the items in the bins have indeed been destroyed. The manifest is then stored for documentation purposes.

Referring back to decision block 126, in the event that the bins were either not safely transported or not safely destroyed (referred to herein as an "incident"), then the method 100 proceeds to FIG. 2, which is indicated by the reference block "A." Reference block "A" begins method 200 of FIG. 2.

FIG. 2 is a flow chart of an exemplary method 200 for check reconstruction in the event of an incident in accordance with an embodiment of the present invention. In block 202, the bank is notified that an incident has occurred. In one embodiment, a third party, instead of or in addition to the bank, is notified of an incident occurring. For example, a third party may be a contractor hired by the bank, a subcontractor, a governmental or regulatory agency, police authorities, and the like. Notification is provided via email, text message, phone call, website update, and/or any other notification means.

In block 204, information about the incident is provided during the notification process. Any information is provided, such as the bin seal number, any items or information compromised, details of the incident, other information about the bins, and the like.

In block 206, the bank (or other third party) initiates privacy notification process. The privacy notification process determines if other parties need to be notified, who should be notified, and what information was compromised. To start the privacy notification process, a ticket is opened with the incident information 207. The incident information 207 includes any information associated with the incident, including the seal number of the bin, the item numbers compromised, the bank accounts of the customer associated with the items compromised, a number assigned to the incident, or any other information associated with the incident. The incident information is input by either the bank, a third party or the party who provides notification of the incident to the bank/third party. This information may be input via a website over the Internet or a secured intranet.

In block 208, a determination is made as to whether action is required to be taken by the bank or appropriate third party. In decision block 210, action is either taken or not taken. If the incident is minor or no notification is necessary, a determination may be made that no action need be taken, as shown in block 212. As such, no notification may be provided to the customer.

If decision block 210 determines that action is to be taken, the method 200 proceeds to blocks 214 and 216. In block 214, data is reconstructed based on the incident information 207. Programmers work to access various databases to determine which items were compromised and what information is contained on such items. The programmers also determine which customers, financial institutions and other parties are associated with the items compromised. The customer account information is also determined. All of such information is provided on the ticket opened in block 206.

In block 216, a team is assembled to create customer and financial institution notifications as well as notify any other party, such as a governmental entity. This team of persons is from either the financial institution or a third party. Additionally, this team may be an electronic software component which automatically provides notification after receiving predefined criteria.

In block 218, notifications are sent out regarding the items compromised. A representative of the assembled team contacts the customer or other party associated with the compromised items and explains the incident and appropriate action plan currently being taken and actions plans which may be taken in the future.

Any portion of the methods 100 and 200 are embodied or performed by a computer system. In another embodiment of the invention, the methods 100 and 200 are performed by a server on a network. In a further embodiment of the present invention, some of the features or functions of the methods 100 and 200 are performed by the computer system and other features or functions of the methods 100 and 200 are performed on the server.

The network is the Internet, a private network or other network. The methods may be performed by computer-readable code which is stored on a file system or memory of a computer system. The computer-readable code is accessed from the file system and run on a processor associated with the computer system.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, functions repeated by the two blocks shown in succession may, in fact, be executed substantially concurrently, or the functions noted in the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention, unless the context clearly indicates otherwise. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein

What is claimed is:

1. A method comprising:
   transferring one or more financial institution items to a bin for transporting the items to be destroyed;
   associating the bin with a bin identifier comprising placing a seal on the bin, where the seal comprises the bin identifier;
   providing an indication of which items are in the bin comprising:
   providing one or more groupings of the one or more financial institution items;
   creating a label for each of the groupings; and associating the labels corresponding to the items placed in the bin with the bin identifier;

creating a manifest comprising bin identifiers and items associated with each bin;

allowing the bin to be transported for destruction;

receiving a destruction notification comprising the bin identifier indicating the items in the bin were destroyed in response to safe transport and safe destruction of the items in the bin;

verifying the bin identifiers received in the destruction notification against the manifest in response to receiving the notification of destruction of the items in the bin; and receiving notification of an incident in response to the bin being compromised.

2. The method of claim 1, further comprising receiving notification of an incident in response to the seal being broken prematurely during transportation for destruction.

3. The method of claim 1, wherein the transferring one or more financial institution items to be destroyed in the bin comprises transferring one or more of the groupings to the bin.

4. The method of claim 1, wherein the items are paper checks that are to be destroyed.

5. The method of claim 1, wherein the transferring one or more financial institution items to a bin for transporting the items to be destroyed comprises at least one of:
 transferring bags of items from an ATM to the bin;
 transferring trays of items from a sorter to the bin; and
 transferring trays of items from a remote processing site to the bin.

6. The method of claim 1, further comprising retaining the labels for future reference.

7. The method of claim 1, wherein in response to receiving the notification of an incident:
 receiving information about the incident including the bin identifier of the bin compromised; and
 determining if action should be taken.

8. The method of claim 7, further comprising:
 in response to determining action should be taken:
  determining which items have been compromised;
  determining a customer associated with the compromised items; and
  notifying the customer of the items compromised.

9. The method of claim 8, further comprising determining at least one of customer account information associated with the compromised items and financial institutions associated with the compromised items in response to determining action should be taken.

10. A method comprising:
 providing one or more groupings of one or more financial institution items;
 transferring the groupings to a plurality of bins which are each used to transport one or more groupings of items to a site where the items will be destructed;
 creating a label for each of the groupings;
 associating each label with the bin that contains the groupings of items corresponding to the label;
 affixing a seal to each of the bins, wherein each seal comprises a unique identifier for each bin;
 creating a manifest comprising bin identifiers and items associated with each bin;
 allowing the bins to be transported for destruction;
 receiving a destruction notification comprising the bin identifier indicating the items in the bin were destroyed in response to safe transport and safe destruction of the items in the bin;
 verifying the bin identifiers received in the destruction notification against the manifest in response to receiving the notification of destruction of the items in the bin; and
 receiving notification of an incident in response to any of the bins being compromised.

11. The method of claim 10, further comprising receiving notification of an incident in response to a seal being broken prematurely during transportation for destruction.

12. The method of claim 11, wherein in response to receiving the notification of an incident:
 receiving information about the incident including the seal numbers of the bins compromised; and
 determining if action should be taken.

13. The method of claim 12, further comprising:
 in response to determining action should be taken:
  determining which items have been compromised;
  determining a customer associated with the compromised items; and
  notifying the customer of the items compromised.

14. A system comprising:
 a bin that receives one or more groupings of financial institution items to be destroyed, the bin having a seal that comprises an identifier, and the groupings of financial institution items each comprising a label associated with the identifier of the bin; and
 a processing unit configured to respond to computer instructions to:
  create a manifest comprising bin identifiers and items associated with each bin;
  receive a destruction notification comprising the bin identifier indicating the items in the holding container were destroyed in response to safe transport and safe destruction of the items in the bin;
  verify the bin identifiers received in the destruction notification against the manifest in response to receiving the notification of destruction of the items in the bin; and
  receive notification of an incident in response to the bin being compromised.

15. The system of claim 14, wherein the processing unit is further configured to determine the customers associated with any items compromised and notify the customers in response to the incident.

16. The system of claim 14, wherein the processing unit is further configured to receive notification of an incident in response to the seal being broken prematurely prior to destruction.

* * * * *